July 5, 1932.  W. GRAF  1,865,687
METHOD OF LOCATING THE FAULT IN THE CASE OF MULTICONDUCTOR
CABLES DAMAGED BY SHORT CIRCUITING
Filed July 11, 1928

Inventor:
Wilhelm Graf
by Spear, Middleton, Donaldson & Hall
Attys

Patented July 5, 1932.

1,865,687

UNITED STATES PATENT OFFICE

WILHELM GRAF, OF BERLIN, GERMANY

METHOD OF LOCATING THE FAULT IN THE CASE OF MULTICONDUCTOR CABLES DAMAGED BY SHORT-CIRCUITING

Application filed July 11, 1928, Serial No. 291,949, and in Germany July 16, 1927.

This invention relates to a method of locating the fault in the case of multi-conductor cables damaged by short-circuiting.

When all the conductors of a cable have been damaged by short-circuiting, it is in the case of all hitherto known methods a difficult matter without faultless auxiliary conductor to determine with sufficient exactitude the point of the fault. The various methods employed provide, generally speaking, satisfactory results only under certain conditions, and are therefore only capable of use to a limited extent. These methods may be divided into roughly two groups, the one being based on resistance measurement and the other on measurement of the drop in voltage.

The methods employing resistance measurement include, for example, that of Blavier, in which the resistance of a double conductor is first measured with insulated and then with short-circuited ends, the fault being calculated from the two values. The fault resistance enters into both measuring values, and should, therefore, not vary to any appreciable extent during the measurement; and for reasons which do not require discussion at the moment the same should be neither too high nor too low.

In the case of the second group of methods the fault is located by the drop in voltage which a current, to be maintained at a constant value, causes in the faulty conductor and in a known resistance connected in series therewith. The fault resistance must, therefore, in this case also be of substantial constancy, while in addition the same should not be greatly excessive, in order that sufficient strength of current is obtainable.

It is the object of the present invention to provide an entirely new method not disclosing the limitations referred to. This method may be termed a branch current method, and has for its basis the following:

Referring to the drawing.

Figure 1:
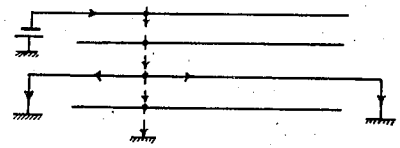
Fig. 1 is a view of connections illustrative of the basic principle of the present invention.

If a voltage is applied to a conductor—with shunt connection—and a second conductor is earthed at both ends, as illustrated in Fig. 1 of the drawing, the current flows over shunt in part direct to earth and in part the same penetrates into the earthed conductor and branches off towards both sides in reversed relation to the resistances. If at both ends of this conductor, which in the following will be termed the measuring conductor, a measuring instrument is connected, it is possible from the branching of the current to calculate the resistance of the measuring conductor section and accordingly the location of the fault.

On this basis a whole number of measuring connections may be developed, which allow the fault to be located in simple and reliable manner. Various examples are furnished in the following:

It may in the first place be remarked that it is preferable to perform the connections over double leads, as illustrated in Figs. 2–6, since when measuring with a single lead and earth the result may be incorrect due to the resistance of the earth connection. It is also advisable to select for the battery circuit such conductors as are spaced as wide apart as possible in the cable, and to employ for the measurement two conductors which are adjacent the battery conductors, in order to obtain as strong a measuring current as possible.

Figure 2:
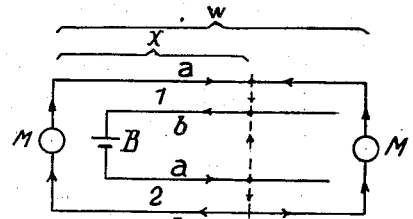
Figs. 2 to 6 illustrate connections performed over double leads and employing for measurement two conductors adjacent the battery conductors to obtain as strong a measuring current as possible.

In Fig. 2 the two measuring conductors $1a$ and $2b$ are connected at the ends with sensitive current meters M of equal ohmic resistance and equal sensitiveness. The current proceeding from B traverses the path marked by arrows. If $x$ is employed to designate the resistance of the double conductor up to the point of fault, $w$ the total resistance of the double conductor, and $i_1$ and $i_2$ the extent of movement of the pointers of the two measuring instruments, the following equation results, the part currents behaving in reversed manner to the resistances:

$$\frac{i_1}{i_2} = \frac{w-x+M}{x+M}.$$

from which results $$x = \frac{M(i_2-i_1)+i_2 \cdot w}{i_1+i_2}$$

Naturally, it is also possible to employ two dissimilar measuring instruments, in which case the formula must be altered accordingly.

The reading must be performed simultaneously from both instruments, as the current tends on occasion to fluctuation due to polarization. The simultaneous reading is achieved by communication via telephone over the battery conductors, or a third double conductor. If in the case of very strong shunt telephonic communication is impossible, communication may be obtained by buzzer and telephonic receiver, or by other signalling means, for example by switching off the battery for short periods, this being made noticeable on both measuring instruments simultaneously by return movement on the part of the pointers. The average of a plurality of varying readings on both sides may be taken.

If the fault resistance is so high that insufficient movement on the part of the pointers is obtainable with the voltage at disposal, it is possible to adopt the following course: The battery is allowed to act for a few minutes on the fault until the current has become more or less constant, the polarization of the battery then being reversed by means of a commutator. By the depolarization thereby occurring at the point of the fault, the current increases for a moment, to then again drop. This is made noticeable on the measuring instruments in the following manner:

Upon the reversal of the polarization the pointer suddenly moves towards the opposite side, proceeding from zero, at first advances rapidly and then slowly remains for a moment stationary and then returns again. The returning points of both instruments, which may readily be read, provide in reliable manner the proportion of the current branching, as the increase and drop in current as indicated by both instruments occurs perfectly synchronously. In this manner it is easily possible to obtain thirty times the amount of the permanent stroke, in addition no signals being required for simultaneous reading. This reversing operation may be repeated as often as desired, whereby the amount of the maximum stroke usually increases.

Figure 3:
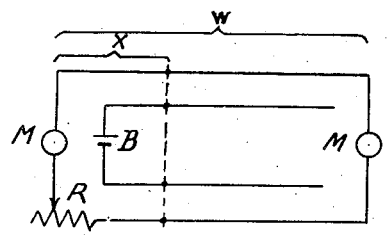

Fig. 3 shows a somewhat modified connection. In this case as much resistance R is additionally connected on that particular side on which the measuring instrument first indicates the largest stroke of the pointer until both instruments indicate the same stroke. In this case $$x = \frac{w-R}{2}.$$

This method is naturally only advisable in such cases in which a telephonic communication between both measuring points is possible; the same, however, has the advantage of supplying an exact result even in the case of greatly fluctuating current, as the setting to equal strokes is simple and reliable; the strokes do not require to be recorded, and comparison between the two pointers need merely be made and if the same do not agree the resistance R adjusted accordingly.

In the case of small strokes it is possible after the completed rough adjustment of the pointers to apply the polarization reversal as described above, for the purpose of obtaining a larger stroke and accordingly greater exactitude in the measurement.

Figure 4:
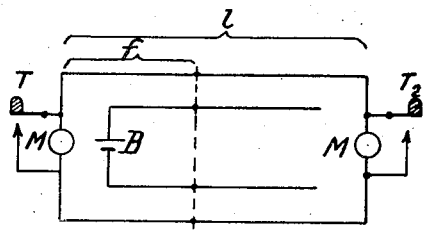

A further connection is shown in Fig. 4. The general arrangement is the same as in the case of Fig. 2, whereby the measuring instruments M, however, may be short-circuited by means of the keys $T_1$ and $T_2$. Upon the measurement this occurs alternately, the stroke of the instrument which is not short-circuited being noted. The proportion of the pointer movements of the two instruments then provides the reversed proportion of the cable section formed by the faulty point.

If current is placed in $$\left.\begin{array}{l} M \text{ left} = i_1 \\ T_2 \quad = I_1 \end{array}\right\} \text{when } T_2 \text{ is depressed,}$$

$$\left.\begin{array}{l} M \text{ right} = i_2 \\ T_1 \quad = I_2 \end{array}\right\} \text{when } T_1 \text{ is depressed,}$$

the result is $$\frac{i_1}{I_1} = \frac{1-f}{f+M} \ [1] \quad \text{and} \quad \frac{i_2}{I_2} = \frac{f}{1-f+M} \ [2].$$

From [1] may be deduced $$\frac{i_1+I_1}{i_1} = \frac{1+M}{1-f} \text{ or } i_1+I_1 = i_1\frac{1+M}{1-f},$$

and from [2] also $$i_2+I_2 = i_2\frac{1+M}{f}.$$

If now it is assumed that the total current in the measuring conductors remains unvaried whichever key be depressed—an assumption which in practice is always fulfilled by sufficient approximity in view of the fact that due to electrolytic processes the fault resistance is high in relation to the resistance of the measuring conductors—the result is $$i_1 \frac{1+M}{1-f} = i_2 \frac{1+M}{f} \text{ or } f = 1 \frac{i_2}{i_1+i_2}.$$

Since in this, beyond $f$ and 1, no ohmic values occur, for $f$ may also be placed the length up to the point of fault and for 1 the total length of the cable.

In the case of this method it is accordingly unnecessary to know the ohmic resistance of the measuring conductor.

The following three connections are intended for such cases in which only one instrument is at disposal, or in which no assistance is available for attention to the second instrument.

Since in the case of these connections only one of the two branch currents is picked up in the measuring loop, two consecutive measurements are necessary, in which the current branching is varied in a manner enabling calculation to be made, so that the point of fault may be determined from the two readings of the one instrument. In this case the same condition applies as previously set forth, viz., that the total current in the measuring loop remains unvaried upon the switching operation.

Figure 5:
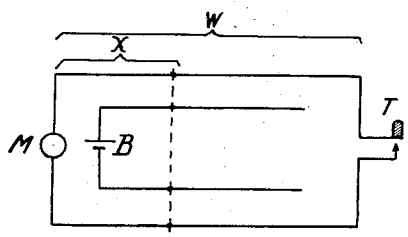

According to Fig. 5, the measuring conductor is alternately opened and closed at the one end by means of the key T, while at the other end the movements of the pointer of the measuring instrument M are read off.

When in the connection according to Fig. 5 the key T is opened, a part of the battery current flows over shunt through the cable stretch $x$ and the measuring instrument M. The deflection of the pointer thus caused is $J$. If the key T is closed, a branching of the current occurs. The one part, which may be referred to as $i$, proceeds over $x$ and M, and the other part, which may be referred to as $i_1$, proceeds over the right-hand cable section and T, the result being:

$$\frac{i}{i_1} = \frac{w-x}{x+M}.$$

Since the passage resistance of the shunt due to electrolytic influences is very high in proportion to the resistance of the cable arteries, no appreciable difference in the strength of the current penetrating the measuring loop occurs when closing the key T. $J$ is therefore $=i+i_1$ or $i_1 = J-i$. If this value is included in the above equation, the result will be $$\frac{i}{J-i} = \frac{w-x}{x+M},$$

and therefore $$x = \frac{w(J-i)-iM}{J}.$$

Figure 6:
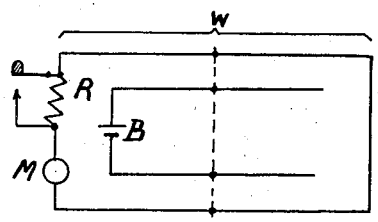

Fig. 6 shows a connection, which allows the pure copper resistance of the measuring conductors to be determined without the point of the fault and the amount of its resistance having any effect on the result. For this purpose the key T is depressed and released alternately, the strokes performed by M being noted. If these are taken as $J$ and $i$, the resistance of the double conductor is as follows:

$$w = \frac{i(M+R)-J.M}{J-i}.$$

The above equation according to Fig. 6 is derived as follows, the following designations being employed:
Left-hand section of the measuring line $x$.
Current in $x$ with closed key $J$.
Current in $w-x$ with closed key $J_1$.
Current in $x$ with open key $i$.
Current in $w-x$ with open key $i_1$.
The following equations result:

$$\frac{J}{J_1} = \frac{w-x}{M+x} \quad (1) \text{ and } \frac{i}{i_1} = \frac{w-x}{M+R+x} \quad (2)$$

From (1) is deduced $$J+J_1 = J\frac{w+M}{w-x}$$

From (2) is deduced $$i+i_1 = i\frac{w+M+R}{w-x}$$

Since for the reasons set forth in the explanation of Fig. 5 the total strength of current in the measuring lines upon opening and closing the key remains practically unaltered, i. e. $J+J_1 = i+i_1$, it is also possible to state:

$$J\frac{w+M}{w-x} = i\frac{w+M+R}{w-x} \text{ or } w = \frac{i(M+R)-JM}{J-i}$$

Two measurements may also be combined, this resulting in certain advantages. If, for example in the formula for connection 2

$$x = \frac{M(i_2-i_1)+i_2.w}{i_1+i_2}$$

in place of $w$ is taken the value from the formula for connection 3, i. e., $w=2x+R$, the following is obtained:

$$x = R\frac{i_2}{i_1-i_2} - M,$$

i. e., an equation in which the resistance $w$ of the entire double conductor is not contained. This is frequently valuable, as in the case of a strong shunt $w$ may only be inexactly determined by ordinary resistance measurement, and also the calculation from the length of cable and the kilometric average values unreliable.

It is, however, possible to find a useful formula for $w$ if the equations covering Figs. 2 and 3 are subtracted. The following is then obtained:

$$w = R\frac{i_1 + i_2}{i_1 - i_2} - 2M.$$

This value for $w$ is in the case of a strong shunt more exact than according to the formula covering Fig. 6, as the same is wholly independent of the fault resistance.

In similar manner it is possible from a measurement according to Fig. 2 and a second similar one, in which a resistance R is additionally connected on the one side, to obtain the following formulæ:

$$x = R \cdot \frac{i_2 \cdot i_3}{i_1 \cdot i_4 - i_2 \cdot i_3} - M;$$

$$w = R\frac{i_2 \cdot i_3 + i_1 \cdot i_3}{i_1 \cdot i_4 - i_2 \cdot i_3} - 2M.$$

In this case $i_1$ and $i_2$ are the strokes performed by the instruments upon the first measurement, and $i_3$ and $i_4$ the strokes upon the second measurement.

The measurements in the case of all these combinations are independent of each other, so that the fault resistance may be variable.

It may also be added that in the case of all connections the measurements may also be conducted with any foreign current available (for example, in the case of telephone cables with current from an exterior or foreign battery), or with the polarization current possibly resulting at the fault itself by reason of electrolysis.

Figure 7:
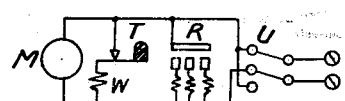
Fig. 7 shows connections for a measuring apparatus for carrying out the method described herein.

Fig. 7 shows a possible connection system for a measuring apparatus for carrying out the method described.

The key T in conjunction with the small resistance $w$ has the object of practically short-circuiting the instrument in the normal position, in order to safeguard the same against unforeseen excess currents.

The plug resistance R enables the measuring scope of the instrument to be increased to certain extent, for example to twice, three or four times the amount. This has the object, when disturbing currents are present, of being able to increase the measuring current in order to decrease the disturbing level, so that the disturbing currents are less noticeable.

The commutator U serves for ready reversal of the polarization—namely, with the battery change as described.

In order to be able to follow the polarization reversal on the measuring instrument, the scale is preferably furnished with the zero point towards the left end, so that the pointer is capable of also moving a few degrees towards the left.

In single leads operations may be performed with earth substituted for the second lead.

It will be understood that I do not limit myself to the various examples and combinations described, but that various other forms may be devised without departing from the spirit of the invention.

What I claim as new and desire to secure by Letters Patent is:

The method of ascertaining the location of a fault in a multi-core cable having intercore faults, consisting in connecting two of the cores at both ends into a loop, supplying these cores through other cores of the cable with current across the point of leakage to impress a potential difference upon said first cores, and determining the proportion of the currents flowing in the two loops.

In testimony whereof I have affixed my signature.

WILHELM GRAF.